(12) United States Patent
Bell, Jr. et al.

(10) Patent No.: US 6,950,892 B2
(45) Date of Patent: Sep. 27, 2005

(54) METHOD AND SYSTEM FOR MANAGING DISTRIBUTED ARBITRATION FOR MULTICYCLE DATA TRANSFER REQUESTS

(75) Inventors: Robert H. Bell, Jr., Austin, TX (US); Robert Alan Cargnoni, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 361 days.

(21) Appl. No.: 10/411,463

(22) Filed: Apr. 10, 2003

(65) Prior Publication Data

US 2004/0205275 A1 Oct. 14, 2004

(51) Int. Cl.[7] .................. G06F 13/368; G06F 12/00
(52) U.S. Cl. .................. 710/120; 710/119; 710/240; 710/242
(58) Field of Search .................. 710/240, 241, 710/305, 120, 119, 121, 122, 123, 124, 125

(56) References Cited

U.S. PATENT DOCUMENTS

| | | | | |
|---|---|---|---|---|
| 5,228,134 A | * | 7/1993 | MacWilliams et al. | 711/138 |
| 5,392,422 A | * | 2/1995 | Hoel et al. | 710/113 |
| 5,506,972 A | * | 4/1996 | Heath et al. | 710/240 |
| 5,623,672 A | * | 4/1997 | Popat | 710/240 |
| 5,781,757 A | * | 7/1998 | Deshpande | 711/146 |
| 5,884,051 A | * | 3/1999 | Schaffer et al. | 710/107 |
| 5,933,610 A | * | 8/1999 | Chambers et al. | 711/113 |
| 5,987,549 A | * | 11/1999 | Hagersten et al. | 710/107 |
| 6,275,888 B1 | * | 8/2001 | Porterfield | 710/312 |
| 6,446,151 B1 | * | 9/2002 | Fischer et al. | 710/124 |
| 6,665,737 B2 | * | 12/2003 | Edwards | 710/3 |
| 6,700,899 B1 | * | 3/2004 | Cao | 370/450 |
| 2003/0110339 A1 | * | 6/2003 | Calvignac et al. | 710/305 |

OTHER PUBLICATIONS

IBM Technical Disclosure Bulletin, vol. 32, No. 5A, Oct. 1989—Two–Level Internal Bus Arbitration for the System IO Bus.*
IBM Technical Disclosure Bulletin, vol. 38, No. 03, Mar. 1995—Real–Time Self–Granting, Centrally Directed Distribution Arbitration with Fairness.*
Proceedings of the 10th international conference on Architectural support for programming languages and operating systems, 2002—ACM Press—A Stateless, Content–Directed Data Prefetching Mechanism.*

* cited by examiner

*Primary Examiner*—Paul R. Myers
*Assistant Examiner*—Jeremy S. Cerullo
(74) *Attorney, Agent, or Firm*—Weiss, Moy & Harris, P.C.; Andrew M. Harris; Casimer K. Salys

(57) ABSTRACT

A method and system for managing distributed arbitration for multi-cycle data transfer requests provides improved performance in a processing system. A multi-cycle request indicator is provided to a slice arbiter and if a multi-cycle request is present, only one slice is granted its associated bus. The method further blocks any requests from other requesting slices having a lower latency than the first slice until the latency difference between the other requesting slices and the longest latency slice added to a predetermined cycle counter value has expired. The method also blocks further requests from the first slice until the predetermined cycle counter value has elapsed and blocks requests from slices having a higher latency than the first slice until the predetermined cycle counter value less the difference in latencies for the first slice and for the higher latency slice has elapsed.

23 Claims, 5 Drawing Sheets

METHOD AND SYSTEM FOR MANAGING DISTRIBUTED ARBITRATION FOR MULTICYCLE DATA TRANSFER REQUESTS

BACKGROUND OF THE INVENTION

1. Technical Field

The present invention relates generally to processors and computing systems, and more particularly, to distributed bus arbitration within a processor on request and data paths having differing latencies between multiple slices.

2. Description of the Related Art

Present-day high-speed processors include a high level of integration and asynchronous designs that permit communication between various resources and one or more processor cores, caches and memory in a highly-efficient manner so that data transfer and other communication occurs at a rate approaching the limits of propagation of digital signals within the processor.

In particular, internal buses of high-speed processors are permitted to transfer data and commands over paths having differing latencies and logic is provided to ensure that the data and commands are properly validated and transferred in order without requiring long synchronous cycles limited by the maximum propagation times. The above is especially true in present-day processors, where data values, program instructions and commands, as well as control signals may be pipelined through many logic stages, with the number of stages through which the above signals pass greatly dependent on chip layout.

One such logical implementation within a processing system is a distributed arbitration scheme including a processor core arbiter and one or more slice arbiters. The distributed scheme permits early indication of data transfer requests from a resource to the processor core. The timing of the early indication in the distributed arbitration case is dependent on the physical location of where data resides, whereas a centralized arbitration scheme generally only provides such indication after the additional cycles necessary to: relay requests to a central point, make the arbitration decision and then relay the decision to the processor core. Thus, centralized arbitration leads to too great a delay in providing indications to the processor core regarding the availability of data.

In such a distributed arbitration scheme, when a resource coupled to a slice arbiter is ready to transfer data to the processor core from one or more slices, the slice arbiter determines assignment of the bus needed for the transfer and thereby indicates to the slices when they may place their data on the bus. At the same time and in parallel, the requests are sent to the core arbiter so that the processor core receives an early indication of a data transfer operation. The core arbiter receives the requests after individual data latency times from the requesting slices have elapsed, enforces the same arbitration decision being made in parallel at the slice arbiter, provides an early indication to the processor core that data will be arriving, and subsequently ensures the transfer of valid data from the slices at the appropriate times when the slice data is available for latching (or loading) at the processor core.

In general, the logic required for handling a sequence of single-cycle data transfer operations is not overly complex, since each requester latency is known and further grants at the slice arbiter (and core arbiter in parallel) can be blocked in particular cycles after granting requests for another slice based on the known latencies of each slice. Further requests from the longest latency slice do not need to be blocked at all and requests from faster slices are blocked in cycles where data would be sent to the core but not selected for loading by either slice arbiter or core arbiter because data arriving from previously arbitrated requests is already being selected.

As described, the core arbiter makes the same arbitration decisions as the slice arbiter, but due to the differing latencies from the slices to the core arbiter, grants do not necessarily occur in the same order as at the slice arbiter. Nevertheless, the same requests granted by the slice arbiter are granted by the core arbiter. Since the order of the grants at the slice arbiter and at the core arbiter will not necessarily match, the data is resynchronized at the processor core (for example, by using the address or tag of the returned data). The core arbiter determines the selection of individual buses coupling the slices to the core via a multiplexer. The core arbiter determines the appropriate slice to grant in a given cycle, and thus can generate the appropriate multiplexer selector to load the data into the appropriate core register.

As described above, the core arbiter makes decisions based on logic that is consistent with the decision-making grant logic for the slice arbiter in conformity with known cycle differences for the latencies for each slice. By knowing when the slice arbiter granted an associated bus to each slice, all data provided from the slices can be used and it is not necessary to notify a slice that a data transfer failed (due to contention for the multiplexer in a given cycle), as the distributed arbitration scheme enforces successful completion of all transfers granted by the slice arbiter.

However, if multi-cycle requests were encountered by such a system, data would be incorrectly provided to the processor core, forcing retry operations or incorrect transfer of data. For example, a request implicating the highest-latency slice will be granted at the slice arbiter before an immediately subsequent request from the lowest-latency slice. But, the core arbiter will grant the request from the lowest-latency slice first, since the highest-latency slice request will not arrive at the core arbiter until much later. For single-cycle request, the above-described blocking is sufficient to prevent multiplexer contention between such out-of order decisions, but when a multi-cycle request has been granted, the existing blocking scheme is insufficient to avoid contention.

It is therefore desirable to provide an arbitration system and method providing improved multicycle data transfer operation in a distributed arbitration system.

SUMMARY OF THE INVENTION

The objective of providing improved multicycle data transfer operation in a distributed arbitration scheme is achieved in a method and apparatus. The method determines whether or not a data transfer operation is a multi-cycle request and in response to a determination that the request is a multi-cycle request, grants an associated bus to only a first slice. The method further blocks any requests from another requesting slice having a lower latency than the first slice until the latency difference between the other requesting slice and the longest latency slice added to a predetermined cycle count has expired. The method also blocks further requests from the first slice until the predetermined cycle count has elapsed. The method also blocks requests from slices having a higher latency than the first slice until the predetermined cycle counter value less the difference in latency for the first slice and for the higher latency slice has elapsed. The apparatus comprises logic for carrying out the methods of the present invention within a processor in accordance with an embodiment of the present invention.

The foregoing and other objectives, features, and advantages of the invention will be apparent from the following, more particular, description of the preferred embodiment of the invention, as illustrated in the accompanying drawings.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein like reference numerals indicate like components, and:

DESCRIPTION OF ILLUSTRATIVE EMBODIMENT

Figure 1:
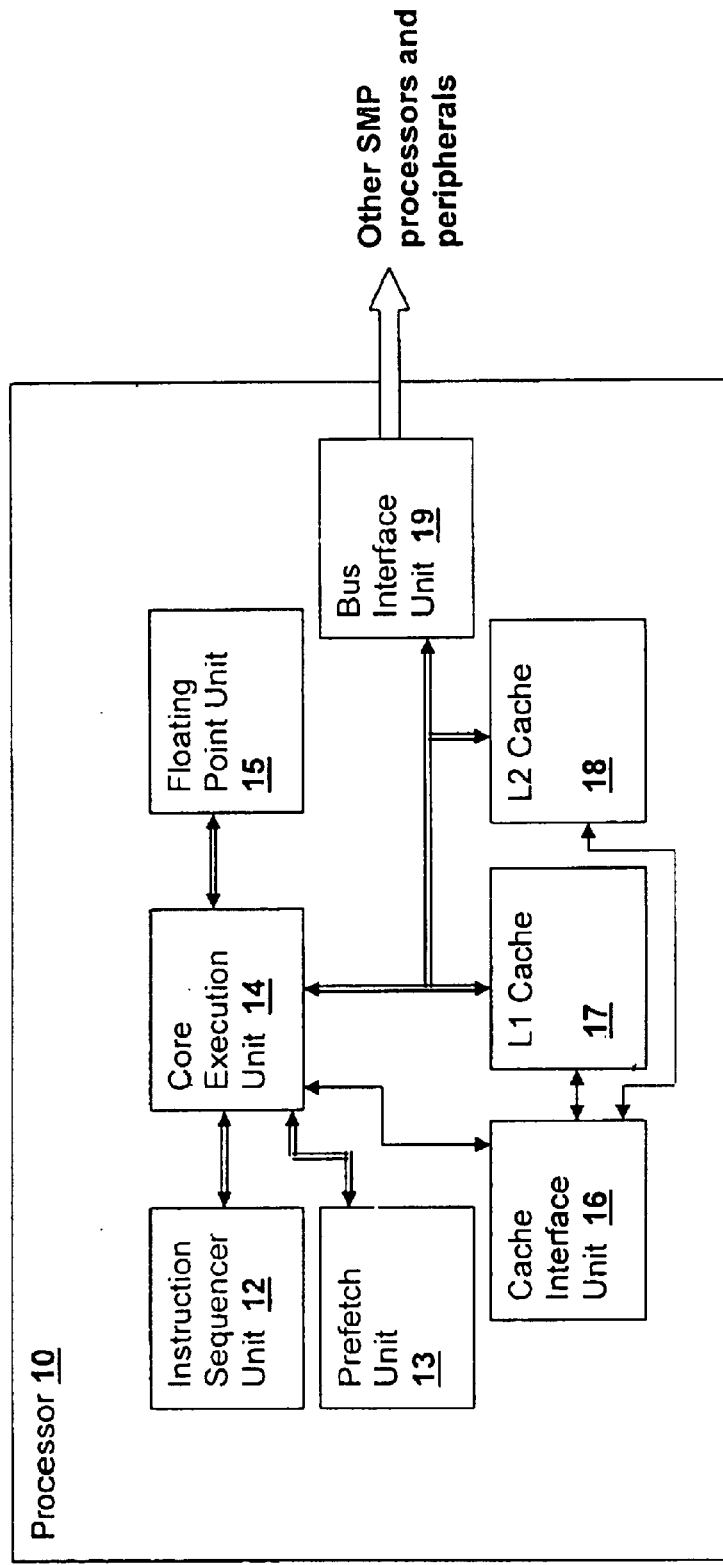
FIG. 1 is a block diagram of a processor in accordance with an embodiment of the invention.

With reference now to the figures, and in particular with reference to FIG. 1, there is depicted a block diagram of a processor 10 embodying a method and an apparatus in accordance with the present invention. Processor 10 is generally of a type used in symmetrical multi-processing systems (SMP) where instructions executed by other processors may implicate values in caches or loaded into resources within processor 10. However, the techniques of the present invention apply to any processor having a data transfer mechanism where transfer requests are provided from the transfer provider (which may be a completion request in eventual response to a command initiated by the transfer recipient). A single processor system may include such data transfer mechanisms, for example when values are reloaded from storage or other resources to a processor core. The term data transfer in the context of the present invention refers to an operation where the immediate request to transfer data arises at the data provider, and in the specific examples refers to operations from a resource requesting data transfer to a processor core. The type of transfer specified by "data transfer" is also not restricted to transfer of "data values" (e.g., variables or constants used by a program), but also program instructions, internal commands, address values, tags and so forth.

Processor 10, includes a core execution unit 14 that controls execution of program instructions and movement of data within processor 10. Core execution unit 14 is coupled to various resources, such as an instruction sequencer unit 12 a prefetch unit 12 a cache interface unit 16, a on-board L1 Cache 17 and L2 Cache 18 as well as a floating point unit 15. Some data transfer instructions are for a single data value, which can be retrieved from the particular requesting slice in a single cycle, but multiple cycle data transfer instructions are also supported by core execution unit 14, requiring that multiple bus cycles be coordinated to retrieve multiple data values, which may be one or more cache lines of L2 Cache 18, for example.

Data transfer instructions may also be implemented in other resource connections to core execution unit 14 as well as connections between devices other than core execution unit 14. The techniques of arbitrating for a bus disclosed herein are applicable to any portion of a processing system requiring a data transfer operation and having multiple slices (data providers) coupled to a shared bus for delivery of data, program instructions or commands to another unit (transfer receiving unit) in the processing system.

Figure 2:
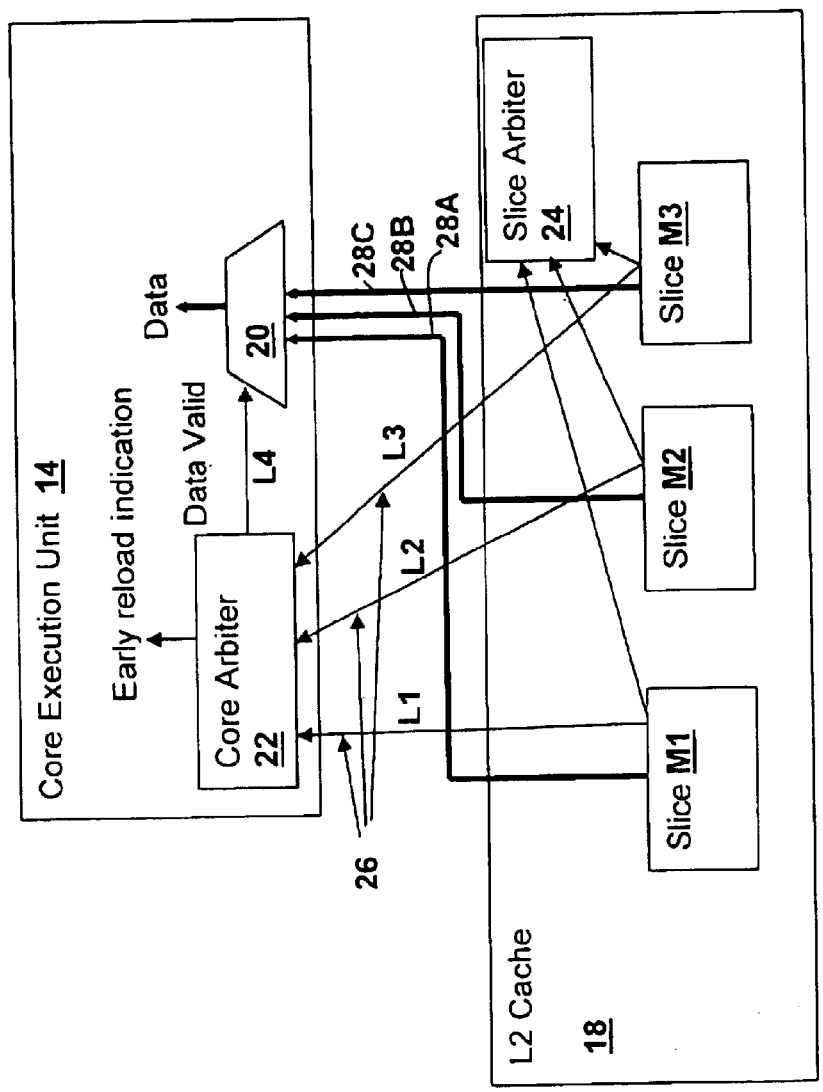
FIG. 2 is a block diagram showing further details within processor 10 of FIG. 1.

Referring now to FIG. 2, details of circuits within processor 10 are depicted. A connection between L2 cache 18 and core execution unit 14 is used for illustrating the techniques of the present invention, but it should be understood that the present invention extends to connections between other units within processor 10 as described above and may also apply to arbitration schemes in general, such as between multiple processors on a high-speed interconnect bus, where early data delivery indication is required at the receiving unit and therefore distributed arbitration is implemented in the interfaces.

Slices M1, M2 and M3 are storage units within L2 cache 18 that have differing latencies to core execution unit 14, which may be due to the architecture of L2 cache 18, or due to the physical location of slices M1, M2 and M3 within processor 10. The illustration of three slices is exemplary and the techniques of the present invention extend to any number of slices, or generally to data providers of any kind. Slices M1, M2 and M3 are coupled to core execution unit 14 by associated buses 28A–28C connecting core execution unit 14 to L2 cache 18. Delivery or data to core execution unit 14 is also exemplary and the techniques of the present invention apply to any data recipient. Request paths 26 may be a single control path or may actually be buses 28A–28C over which data transfer request indications are sent to a core arbiter 22. A slice arbiter 24 is coupled to slices M1, M2 and M3 and receives request indications from each of slices M1, M2 and M3. The task of slice arbiter 24 is to avoid contention and mis-sequencing of data delivery from slices M1, M2 and M3 to a multiplexer 20 within core execution unit 14. As multiplexer 20 can only select data from one of buses 28A–28C per cycle, the task of slice arbiter is to avoid sending data from slices M1, M2 and M3 that would arrive in the same cycle at multiplexer 20 to avoid loss of data arriving simultaneously from multiple slices. The task of core arbiter 22 is to determine what data (if any) to source from multiplexer 20 in any given cycle. Multiplexer 20 is shown as a centralized multiplexer within a processor core, but multiplexers within systems in accordance with other embodiments the present invention may incorporate distributed multiplexers where the destination of data for the data transfer operation depends upon a multiplexer address and the timing of the data valid signal may be adjusted consistent with a differing multiplexer latency.

Core arbiter 22 is tasked with determining the order and cycle timing of data associated with requests granted by slice arbiter 24, so that the order and cycle timing of data arriving at core execution unit 14 (which is dictated by decisions made at slice arbiter 24) is correctly determined for proper loading of data to core execution unit 14. Request latencies L1, L2 and L3 from slices M1, M2 and M3 differ and are ordered from highest latency L3 to lowest latency L1 for the examples given herein. Core arbiter 22 also delivers a data valid signal with a latency of L4 that operates multiplexer/latch 20 to deliver the proper data to registers within core execution unit 14. The additional latency to the assertion of the data valid signal permits killing/blocking of requests that have been subsequently invalidated because they were not granted at slice arbiter 24. The data is likewise delayed from requests from slices M1, M2 and M3 by L4 so that the data valid assertion lines up with the data provided. If the data and data valid signal were not delayed (i.e., requests and data sent at the same time from slices M1, M2 and M3), there would be no time for slice arbiter 24 to block data loading on to buses 28A–28C that would later be rejected at multiplexer 20, consuming unnecessary power and busying the slice with an unnecessary task. No bandwidth penalty is associated with the delay, as the data valid/data delay represents only a fixed cycle offset between requests and data.

In the context of the present invention, for multi-cycle operations, it is critical for core arbiter 22 to be able to kill requests that were delivered from slices M1 and M2 that are in transit to core arbiter 22 while the reload bus was already granted by slice arbiter 24 to a higher latency slice for a multi-cycle operation. The above-described operation enforces the grants determined by slice arbiter 24 at core arbiter 22, so that requests that were not granted by slice arbiter 24 but are received by core arbiter 22 are not mistakenly granted by core arbiter 22. The data valid L4>= L3−L1 latency relationship provides the time required to implement the capability to kill such requests. For single cycle operations, Table I describes the operation of slice arbiter 24.

TABLE I

| M1 | M2 | M3 | Grant in Cycle 1 | Block in cycle 1 + L3 − L2 | Block in cycle 1 + L3 − L1 | Block in cycle 1 + L2 − L1 |
|----|----|----|---|---|---|---|
| 0 | 0 | 0 | none | | | |
| 0 | 0 | 1 | M3 | M2 | M1 | |
| 0 | 1 | 0 | M2 | | | M1 |
| 0 | 1 | 1 | M2, M3 | M2 | M1 | M1 |
| 1 | 0 | 0 | M1 | | | |
| 1 | 0 | 1 | M1, M3 | M2 | M1 | |
| 1 | 1 | 0 | M1, M2 | | | M1 |
| 1 | 1 | 1 | M1, M2, M3 | M2 | M1 | M1 |

The left three columns of Table I show requests from each of slices M1, M2 and M3, presented to core arbiter 24 with a logical "1" representing the requesting state and "0" the non-requesting state. All requested slices are granted in cycle 1 for all of the combinations of slice requests, assuming no cycles are already in progress toward the core at cycle 1, which is the initial condition before any requests have been granted by slice arbiter 24. After requests have been granted, further requests from slices M1 and M2 must be blocked in a cycle determined by the longer latencies associated with data travelling to core execution unit 14.

For example, if all three slices M1, M2 and M3 are permitted to transfer data starting in cycle 1, further requests from slice M3 do not have to be blocked at slice arbiter 24, since the first transfer cycle will have completed (at cycle L3) before the next request from slice M3 propagates to core arbiter 22 (at cycle L3+1). However, further requests from slices M1 and M2 must be blocked in the cycle where the request would cause their data arrival to coincide with arrival of data provided for the request from slice M3. Because the data is delayed by L4 cycles after the requests, data from another slice would arrive in the same cycle as the data from slice M3 and multiplexer 20 would be unable to load data from both slices. Requests from slice M1 must also be blocked in the cycle where the request would arrive simultaneously with the request from slice M2, i.e., the cycle at which the data would arrive at cycle L2, which for slice M1 is cycle 1+L2−L1. In general, the table reflects blocking of requests for particular cycles in which a previous request granted at slice arbiter 24 will arrive at core arbiter 22, preventing simultaneous arrival of data satisfying requests from multiple slices.

The above description assumes that request latencies are equal to data latencies for the slices. If the data latency differs from the request latency by a constant number of cycles (other than the data/data valid latency already mentioned), the grant cycle must be delayed by an amount equal to the data latency excess (for example if the data latency is 4 cycles longer than the request latency, the table would be implemented to show a grant in cycle 4 rather than cycle 1). If the data latencies differences varied, a system could either wait the maximum of the data latencies or implement complex logic to delay the maximum data latency implicated for pending cycles.

The above arbitration scheme can be implemented without error, even though core arbiter 22 and slice arbiter 24 grant requests at different times, because the request type is delivered to core execution unit 14 with the same latency as the data, offset by L4 cycles. Slice arbiter 24 grants requests in one order, and core arbiter 22 grants requests in a different order (if the requests are within the differing latency times of the slices), but the data can always be sorted to the proper destination, because the latencies for requests and data are the same for each slice and therefore the data is offset from each request by L4 cycles. If requests arrive simultaneously at core arbiter 22, the request from the longest latency slice is granted first, which is consistent with the grants at slice arbiter 24, according to Table 1. Thus core arbiter 22 can always associate data provided on bus 28A–C with the providing slice by granting the request according the above-described process.

However, when implementing multi-cycle requests (i.e., those cycle types for which multiple cycles are required to satisfy the data transfer operation), the arbitration scheme outlined in Table 1 fails, since requests could be granted for slices while a multi-cycle request is still being satisfied for another slice, the blocking of requests for a single cycle will not prevent multiplexer contention between multi-cycle operations with other multi-cycle or single-cycle operations. In order to prevent contention between data for multi-cycle operations and other operations, the distributed arbitration system can be updated to block requests for further operations for a time sufficient to guarantee completion of a pending multi-cycle data transfer operation. To accomplish efficient operation, slice arbiter 24 and core arbiter 22 use an indication of a multi-cycle operation, which is generally an operation type decodable from the request indication, but may be alternatively delivered along a separate control path.

Table II shows a behavior of slice arbiter 24 when all requests are multi-cycle operation types.

TABLE II

| M1 | M2 | M3 | Grant in Cycle 1 | Block to cycle 1 + K + L3 − L2 | Block to cycle 1 + K + L3 − L1 | Block to cycle 1 + K + L2 − L1 | Block to cycle 1 + K | Block to cycle 1 + K − (L3 − L2) | Block to cycle 1 + K − (L3 − L1) | Block to cycle 1 + K − (L2 − L1) |
|---|---|---|---|---|---|---|---|---|---|---|
| 0 | 0 | 0 | none | | | | | | | |
| 0 | 0 | 1 | M3 | M2 | M1 | | M3 | | | |
| 0 | 1 | 0 | M2 | | | M1 | M2 | M3 | | |
| 0 | 1 | 1 | M3 | M2 | M1 | | M3 | | | |
| 1 | 0 | 0 | M1 | | | | M1 | | M3 | M2 |
| 1 | 0 | 1 | M3 | M2 | M1 | | M3 | | | |
| 1 | 1 | 0 | M2 | | | M1 | M2 | M3 | | |
| 1 | 1 | 1 | M3 | M2 | M1 | | M3 | | | |

The requesting slice having the longest latency is granted first. Requests from other slices are blocked in all cycles subsequent until a predetermined cycle counter value "K" has elapsed, where K is at least the minimum number of cycles required to complete the multi-cycle data transfer operation. It can be observed that after the longest latency slice request is granted, that slice is blocked until cycle 1+K when K cycles have elapsed. Additionally, multi-cycle requests from lower latency slices are blocked until cycle 1+K and also a number of cycles equal to their latency difference has elapsed, ensuring that the multi-cycle transfer is complete and that a multi-cycle request from the lower latency slice will not be received at core arbiter 22 before the multi-cycle transfer request has propagated to core execution unit 14.

Additionally, multi-cycle requests from higher-latency slices are blocked for a number of cycles less than the K cycle completion interval by the latency difference between the granted slice and each higher latency slice. For example, when slice M1 is the granted slice performing a multi-cycle transfer, slice M2 requests are blocked until cycle 1+K−(L2−L1) and slice M3 requests are blocked until cycle 1+K−(L3−L1), delaying requests from higher latency slices until the potential for data contention with the multi-cycle request propagating to core execution unit 14 is avoided.

When the requests received by slice arbiter 24 are a mixture of single-cycle and multi-cycle requests, the following rules provide selection of the processing scheme (Table I scheme or Table II scheme) for blocking and granting bus 28A–C in response to the requests.

1) If any lower latency request is for a multi-cycle operation, that request is not granted according to the rules of Table II, irrespective of whether or not the highest latency request was single-cycle or multi-cycle.
2) If the highest-latency request is for a single-cycle operation, other lower latency single-cycle requests are granted according to the rules of Table I.
3) If the highest-latency request is for a multi-cycle operation, other lower-latency single-cycle requests are granted according to the rules of Table I if the other requests occur in cycle 1 or before the blocking cycle shown in Table 1 for the requesting slice(s). Subsequent to the particular blocking cycle for the slice, any requests that occur from that slice are blocked according to the rules of Table II.

For example, if slices M1, M2 and M3 are all requesting in cycle 1, and the requests from slices M1 and M3 are multi-cycle, but the request from slice M2 is single-cycle, slices M3 and M2 are granted their buses according to rules 1 and 3 above, but M1 is not granted its bus according to rule 1. In cycle 2, if slice M1 then makes a single-cycle request, slice M1 is then granted its bus, because according to rule 3 and Table I, a request in cycle 2 is less than 1+(L3−L1)=3, so the request is not blocked.

In addition to the changes to slice arbiter 24, core arbiter 22 is also modified to compensate for incorrect grants to multi-cycle operations from lower latency slices when a single cycle or multi-cycle transfer from a higher latency slice arrives that was granted at slice arbiter 24 according to Table I or Table II and the rules for mixed single-cycle and multi-cycle requests above. Table III shows the multi-cycle requests that must be "killed" at core arbiter 22. The implementation of a "kill" does not affect slice arbiter 24 or slices M1, M2 or M3, but prevents granting of a request at core arbiter 22 of a request that was denied at slice arbiter 24 and assertion of a data valid signal for the previous denied request which would otherwise multiplex and/or latch invalid or incorrect data at core execution unit 14.

TABLE III

| Grant in Cycle 1 | Kill request previously granted in cycles 1 − (L3 − L2) to cycle 1 | Kill request previously granted in cycles 1 − (L3 − L1) to cycle 1 | Kill request previously granted in cycles 1 − (L2 − L1) to cycle 1 |
|---|---|---|---|
| M3 | M2 | M1 | |
| M2 | | | M1 |

It can be seen in Table III that requests previously granted in cycles prior to cycle 1 are "killed" at core arbiter 22, where killing effectively causes the arriving denied requests to be ignored. Table III shows killing of requests based on a grant in cycle 1 to a slice performing a multi-cycle reload operation. Multi-cycle requests from lower latency slices that were granted at slice arbiter 24 prior to cycle 1 are killed if they were granted within the latency difference between the multi-cycle reloading slice and the requesting slice. Therefore, the time required for generating a data valid must be longer than the longest latency difference between the slices. For example, L4>=L3−L1 in the illustrated embodiment.

Core arbiter 22 also uses a counter to block subsequent single-cycle and multi-cycle operations, similar to the cycle counter operation within slice arbiter 24. The counter blocks grants to subsequent operations after a grant to a multi-cycle operation for K+1 cycles starting with the grant cycle.

Some multi-cycle requests that would otherwise be blocked at core arbiter 22 due to prior multi-cycle transfers must also be enabled for arbitration as illustrated in Table IV.

TABLE IV

| Grant in Cycle 1 | Allow request between cycle 1 up to cycle 1 + (L3 − L1) | Allow request between cycle 1 up to cycle 1 + (L2 − L1) | Allow request between cycle 1 up to cycle 1 + (L3 − L2) |
|---|---|---|---|
| M1 | M3 | M2 | |
| M2 | | | M3 |

If a lower latency slice was granted at cycle 1 by core arbiter 22 for a multi-cycle request, then higher latency slice requests arriving at core arbiter 22 that were granted by slice arbiter 24 in preference over the lower-latency request must be allowed for arbitration at core arbiter 22. Table IV depicts allowing requests arriving within the latency difference between the (lower latency) multi-cycle request data provider and the (higher latency) slice that was previously granted the bus at slice arbiter 24.

Figure 3:
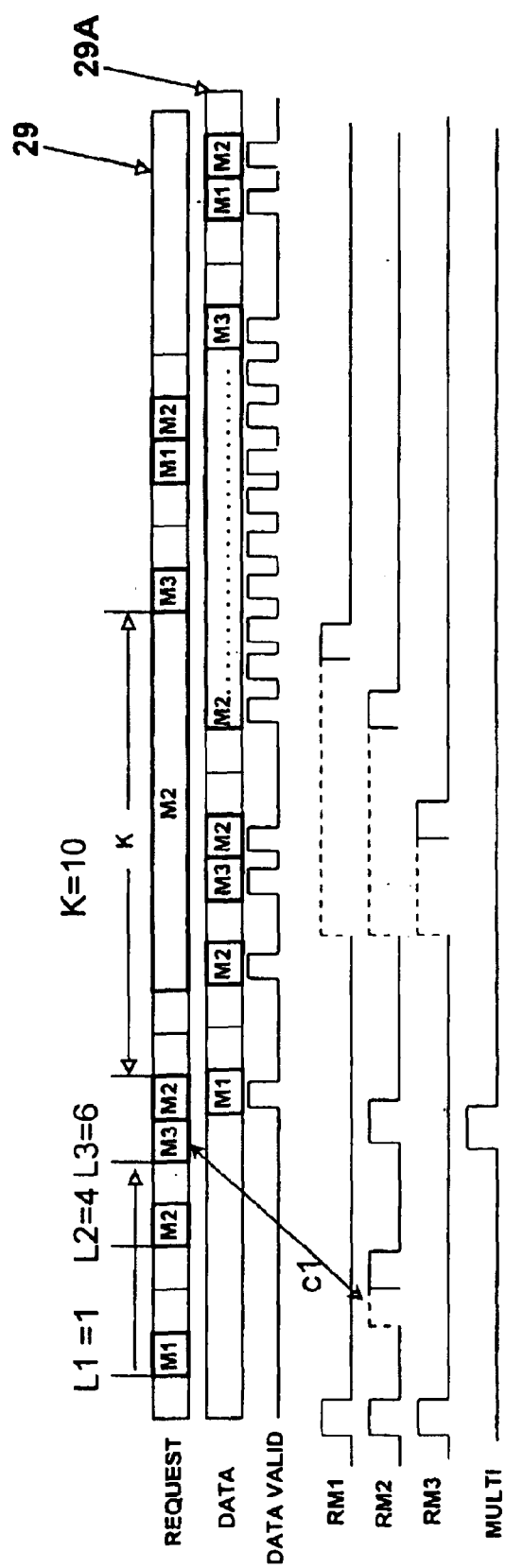
FIG. 3 is a timing diagram showing data transfer operations within a processor in accordance with an embodiment of the invention.

Referring now to FIG. 3, bus operation in the above-described system is depicted. Request/data delivery at core execution unit 14 is depicted in the cells of pipelines (which may actually be a single bus for each slice) forwarding request indications 29 and multiplexer input data 29A. Request lines RM1, RM2 and RM3 are indication of requests to core arbiter 24 to transfer data. The cells of the request pipeline 29 and data pipeline 29A correspond to cycles, with the leftmost cell, cycle 1. At cycle 1, all three requests are asserted and granted, as MULTI, which indicates a multi-cycle operation is not asserted. At cycle 2, a request is delivered from M1 due to a one-cycle latency. At cycle 5, a request is delivered from M2 and at cycle 7, a request is delivered from M3. RM2 is asserted again at cycle 3, but is blocked at slice arbiter 24 since the formula for blocking slice M2 grants based on a slice M3 grant in cycle 1 (From Table I) is 1+(L3−L2)=cycle 1+6−4=cycle 3. The above grant denial assures that data from slice M2 does not contend for multiplexer 20 (c1 indicates the potential contention relationship) with data from slice M3 in cycle 7+L4 (where L4=6 in this example) at core execution unit 14. Note that both requests arrive at core arbiter 22 in cycle 7 and the core arbiter 22 also chooses slice M3 over slice M2 since slice M3 is the slice having the longest latency.

The M2 request is then granted at cycle 4, arriving at core arbiter 22 in cycle 8, and delivering data in cycle 14. A multi-cycle request is made from M2 in cycle 7, which is granted and the request starts arriving at core execution unit 14 at cycle 11. RM1, RM2, RM3 are again asserted in cycle 12 for single-cycle operations, but are blocked until 7+K+L2−L1=cycle 20 for RM1, 7+K=cycle 17 for RM2, and 7+K−(6−4)=cycle 15 for RM3. Only reload data from slices granted by slice arbiter 24 was actually loaded onto reload bus 28 and the loaded data arrives at the core in a cycle determined by the L4 delay (6 cycles in the example) and the latency of the slice.

The data for the above-described granted requests is depicted in bus pipeline M1, M2 and 29A that represents valid data at the input of multiplexer 20 from buses 28A–28C. A data valid signal latches the data into registers within core execution unit 14 (or an internal latch of multiplexer 20). The delay between the data/data valid signal and the requests arriving at core arbiter 24 is L4 depicted here as 6 cycles. The data is loaded into the core execution unit 14 via multiplexer 20 at a time L4 cycles after the arrival of the request. Therefore, by blocking requests according to Table II at slice arbiter 24 as illustrated above, grants that could be made by slice arbiter 24 immediately after the end of the multi-cycle operation (cycle 7+K) in the above illustration, are denied until the latency difference between the slice performing the just-completed multi-cycle operation and a higher latency slice has elapsed, preventing denial of such request by core arbiter 22 so that core arbiter 22 does not mistakenly deny requests that were granted following a multi-cycle operation.

Figure 4:
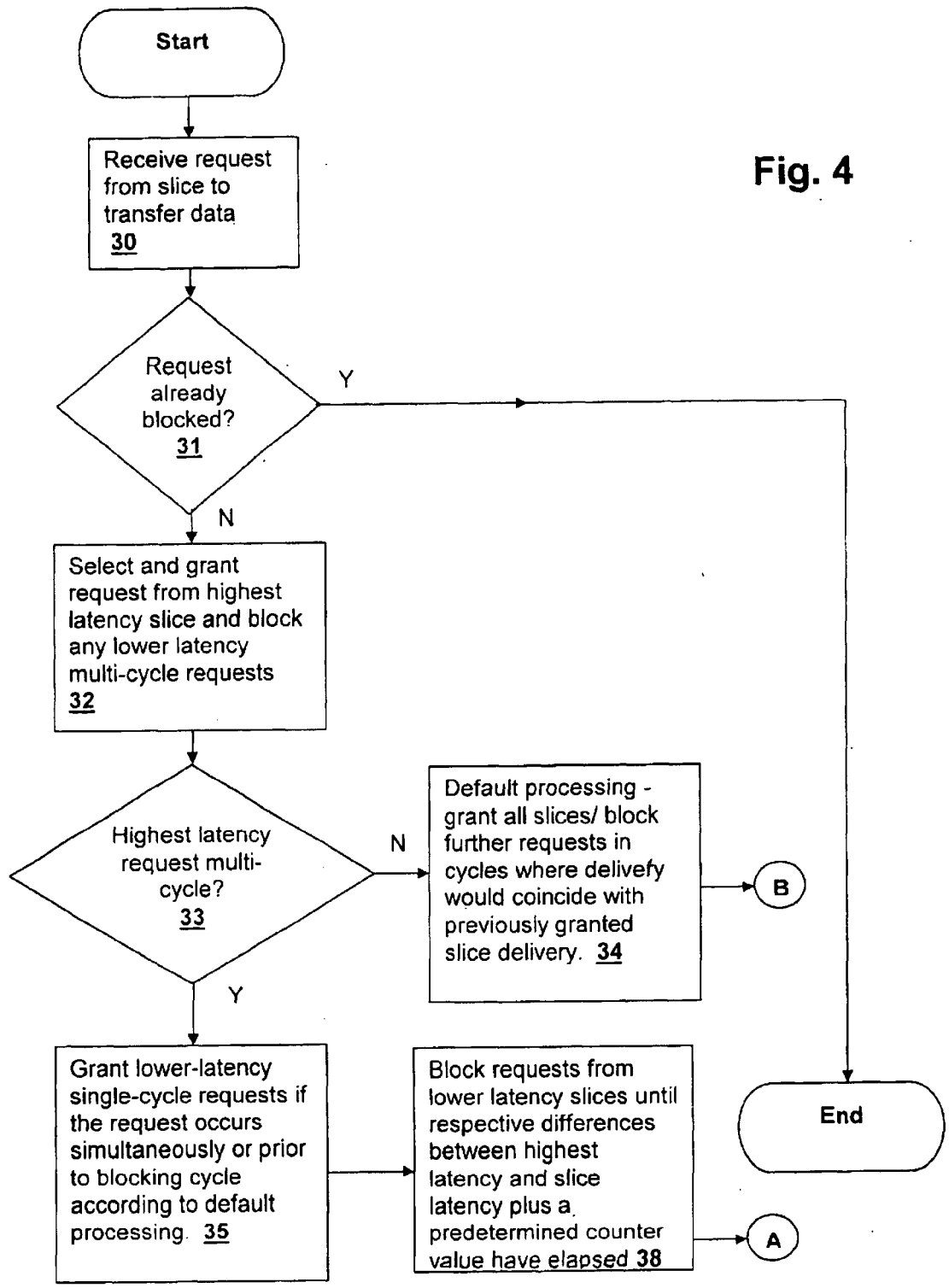
FIGS. 4 and 5 are a flowchart showing a method in accordance with an embodiment of the invention.
Figure 5:
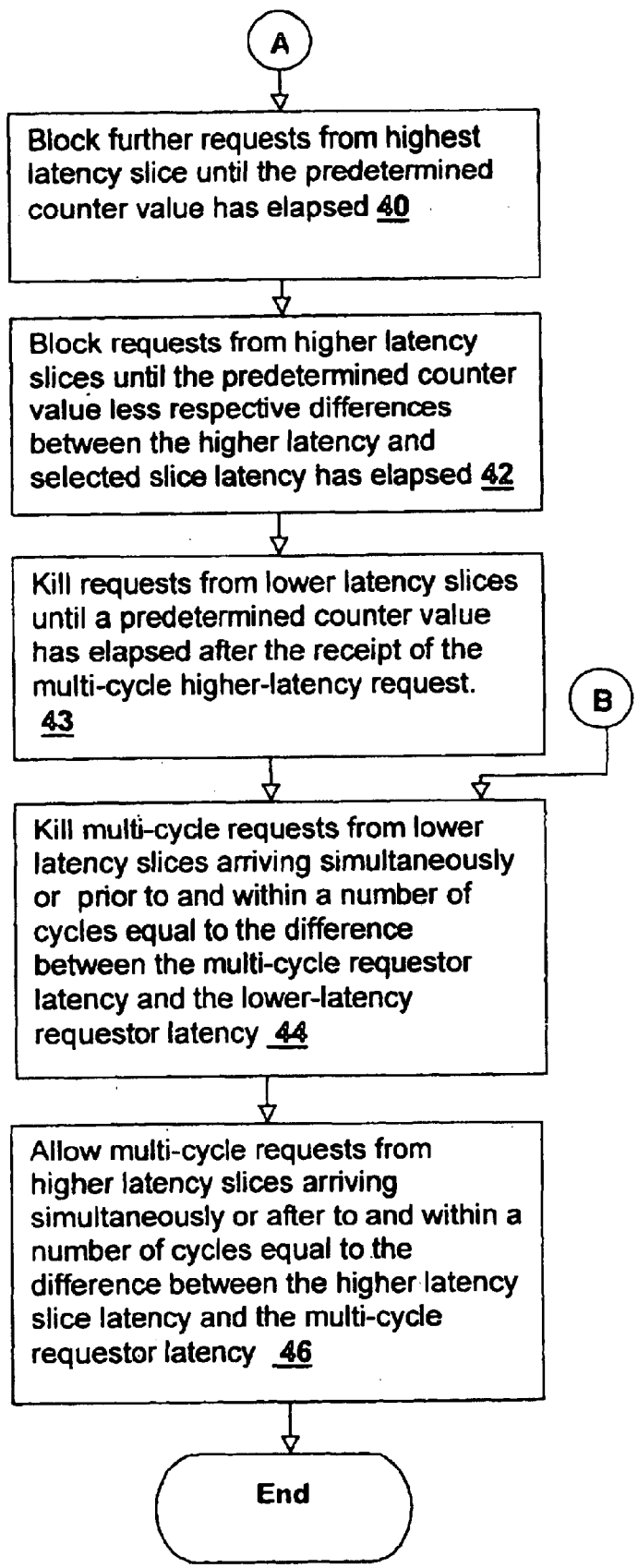

Referring now to FIGS. 4 and 5, a method in accordance with an embodiment of the invention is depicted. A data transfer request is received at slice arbiter 24 (step 30) and if the request has not been blocked by previous processing (decision 31), the highest latency request is granted (step 32) and all lower-latency multi-cycle requests are blocked. If the highest-latency request is not a multi-cycle operation (decision 33), default single cycle processing grants all of the requesting slices and blocks further requests in cycles where delivery would correspond to previously granted slice data delivery (step 34). Otherwise, if the highest latency request is a multi-cycle request, lower-latency single-cycle requests are granted if the request occurs prior to the blocking cycle for default single-cycle processing (step 35). Requests from lower latency slices are then blocked until respective differences between the highest latency and slice latency plus the predetermined counter value has elapsed (step 38). Also, further requests from the highest latency (granted) slice are blocked until the predetermined counter value has elapsed (step 40). Finally, requests from higher latency slices are blocked until the predetermined counter value less respective differences between the higher latency and the slice latency has elapsed (step 42).

At core arbiter 22, a lower-latency multi-cycle request is killed if it arrives within the count value K of a previous grant to a higher-latency multi-cycle operation (step 43). Additionally, a lower-latency multi-cycle request is killed if it arrives at the same time as the higher-latency request or prior to and within a number of cycles equal to the difference between the multi-cycle requester latency and the lower-latency requester latency (step 44). A higher-latency multi-cycle request is allowed if it arrives at the same time as a lower-latency multi-cycle request or after and within a number of cycles equal to the difference between the multi-cycle requester latency and the lower-latency multi-cycle requester latency (step 46).

In general, the slice arbiter steps described above are performed simultaneously as a request is received at the slice arbiter and the steps described above for the core arbiter are performed simultaneously as a request arrives at the core arbiter, with slight variations possible due to particular logic designs and depending on the particular timing of blocking, killing and allowing operations.

While the invention has been particularly shown and described with reference to the preferred embodiment thereof, it will be understood by those skilled in the art that the foregoing and other changes in form, and details may be made therein without departing from the spirit and scope of the invention.

What is claimed is:

1. A method for managing arbitration between a plurality of slices of a transfer provider and a transfer recipient, wherein the slices are coupled to the transfer recipient via a plurality of associated buses, each of the plurality of slices having differing latencies to the transfer recipient, and wherein the method comprises:

receiving a transfer request implicating one or more of said plurality of slices;

determining whether or not said transfer request requires multiple data cycles;

in response to determining that multiple data cycles are required by said transfer request, granting an associated one of said buses to only a first one of said plurality of slices; and in response to determining that multiple data cycles are not required by said transfer request, granting associated buses to all of said plurality of slices implicated in said transfer request.

2. The method of claim 1, further comprising selecting a highest-latency one of said plurality of slices implicated in said transfer request as said first one of said plurality of slices.

3. The method of claim 1, further comprising responsive to determining that multiple data cycles are required by said transfer request, blocking at said transfer provider a request from a second slice having a lower latency than said first one of said plurality of slices until a predetermined cycle counter value period plus a difference between said latency of said first one of said plurality of slices and said latency of said second slice has elapsed.

4. The method of claim 1, further comprising responsive to determining that multiple data cycles are required by said transfer request, blocking at said transfer provider further requests from said first slice until a predetermined cycle counter value has elapsed.

5. The method of claim 4, further comprising responsive to determining that multiple data cycles are required by said transfer request, blocking at said transfer provider a request from a second slice having a higher latency than said first one of said plurality of slices until said predetermined cycle counter value less a difference between said latency of said second slice and said latency of said first one of said plurality of slices has elapsed.

6. The method of claim 5, further comprising:
   selecting a highest-latency one of said plurality of slices implicated in said request as said first one of said plurality of slices; and
   responsive to determining that multiple data cycles are required by said transfer request, blocking at said transfer provider a request from a third slice having a lower latency than said first one of said plurality of slices until a predetermined cycle counter value plus a difference between said latency of said first one of said plurality of slices and said latency of said third slice has elapsed.

7. The method of claim 6, further comprising killing at said transfer recipient requests, from a second slice having a lower latency than said first one of said plurality of slices, until a predetermined cycle count value has elapsed.

8. The method of claim 6, further comprising:
   killing at said transfer recipient requests from a second slice having a lower latency than said first one of said plurality of slices that were made within a difference between said latency of said first one of said plurality of slices and said latency of said second slice after said granting; and
   allowing arbitration at said transfer recipient of a request from a third slice having a higher latency than said first one of said plurality of slices when a difference between said latency of said third slice and said latency of said first one of said plurality of slices has elapsed.

9. The method of claim 1, further comprising responsive to determining that multiple data cycles are required by said transfer request, blocking at said transfer provider a request from a second slice having a higher latency than said first one of said plurality of slices until a predetermined cycle counter value less a difference between said latency of said second slice and said latency of said first one of said plurality of slices has elapsed.

10. The method of claim 1, further comprising killing at said transfer recipient a multi-cycle request from a second slice having a lower latency than said first one of said plurality of slices that were made within a difference between said latency of said first one of said plurality of slices and said latency of said second slice after said granting.

11. The method of claim 1, further comprising killing at said transfer recipient requests, from a second slice having a lower latency than said first one of said plurality of slices, until a predetermined cycle count value has elapsed.

12. The method of claim 1, further comprising allowing arbitration at said transfer recipient of a multi-cycle request from a second slice having a higher latency than said first one of said plurality of slices when a difference between said latency of said second slice and said latency of said first one of said plurality of slices has elapsed.

13. A processor, comprising:
   a transfer receiving unit within said processor that receives data associated with a transfer request;
   a resource coupled to said transfer receiving unit, and having a plurality of slices each coupled to said transfer receiving unit by an associated one of a plurality of buses, said slices having differing request latencies to said transfer receiving unit; and
   a slice arbiter coupled to said plurality of slices for arbitrating requests for said buses, and wherein said slice arbiter includes a circuit for producing an indication of whether or not an individual request is a multi-cycle transfer request, whereby operation of said slice arbiter is a changed in conformity with a state of said indication.

14. The processor of claim 13, wherein said slice arbiter grants an associated one of said buses to only a first one of said plurality of slices when said indication indicates a multi-cycle transfer request and grants associated buses to all implicated slices if said request is a single-cycle transfer request.

15. The processor of claim 14, wherein said slice arbiter selects a highest-latency one of said plurality of slices implicated in a request as said first one of said plurality of slices.

16. The processor of claim 14, wherein said slice arbiter blocks a request from a second slice having a lower latency than said first one of said plurality of slices until a predetermined cycle counter value plus a difference between said latency of said first one of said plurality of slices and said latency of said second slice has elapsed.

17. The processor of claim 14, wherein said slice arbiter blocks further requests from said first slice until a predetermined cycle counter value has elapsed.

18. The processor of claim 14, wherein said slice arbiter blocks a request from a second slice having a higher latency than said first one of said plurality of slices until said predetermined cycle counter value less a difference between said latency of said second slice and said latency of said first one of said plurality of slices has elapsed.

19. The processor of claim 14, further comprising a core arbiter coupled to said plurality of slices for enforcing decisions made by said slice arbiter at said transfer receiving unit, and wherein said core arbiter comprises a counter circuit for killing multi-cycle requests from a second slice having a lower latency than said first one of said plurality of slices that were made after said granting until a predetermined count value has elapsed.

20. The processor of claim 14, further comprising a core arbiter coupled to said plurality of slices for enforcing decisions made by said slice arbiter at said transfer receiving unit, and wherein said core arbiter comprises a circuit for killing multi-cycle requests from a second slice having a lower latency than said first one of said plurality of slices that were made within a difference between said latency of said first one of said plurality of slices and said latency of said second slice after said granting.

21. The processor of claim 14, further comprising a core arbiter coupled to said plurality of slices for enforcing decisions made by said slice arbiter at said transfer receiving unit, and wherein said core arbiter comprises a circuit for arbitrating a request for a multi-cycle transfer from a second slice having a higher latency than said first one of said plurality of slices when a difference between said latency of said second slice and said latency of said first one of said plurality of slices has elapsed.

22. A processor, comprising:

a transfer receiving unit within said processor;

a resource coupled to said transfer receiving unit, and having a plurality of slices with differing latencies to said transfer receiving unit; and a slice arbiter coupled to said plurality of slices for arbitrating requests for a bus coupling said plurality of slices to said transfer receiving unit; and means for determining whether or not an individual request is a multi-cycle transfer request, whereby operation of said slice arbiter is a changed in conformity with a state of said indication.

23. The processor of claim 22, further comprising:

a core arbiter coupled to said plurality of slices for enforcing decisions made by said slice arbiter at said transfer receiving unit; and means, responsive to said determining means determining that an individual multi-cycle transfer request, for maintaining an order of arrival of data transfer data supplied from said slices to said transfer receiving unit.

* * * * *